United States Patent
Beadle et al.

(10) Patent No.: US 7,205,859 B2
(45) Date of Patent: Apr. 17, 2007

(54) METHOD AND APPARATUS FOR SUB SAMPLE-PER-SYMBOL DEMODULATOR FOR A SPECTRALLY EFFICIENT WAVEFORM WITH AN LPI FEATURE

(75) Inventors: Edward R. Beadle, Melbourne, FL (US); John F. Dishman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 384 days.

(21) Appl. No.: 10/388,510

(22) Filed: Mar. 17, 2003

(65) Prior Publication Data

US 2004/0184565 A1 Sep. 23, 2004

(51) Int. Cl.
*H03C 3/00* (2006.01)
(52) U.S. Cl. ...................... 332/100; 332/103; 375/265; 375/348
(58) Field of Classification Search ................ 332/144, 332/100, 103; 324/345, 346; 375/324, 340, 375/341, 265, 348; 329/304
See application file for complete search history.

(56) References Cited

U.S. PATENT DOCUMENTS

| | | | | |
|---|---|---|---|---|
| 4,853,944 A | * | 8/1989 | Lo et al. ...................... | 375/323 |
| 6,690,739 B1 | * | 2/2004 | Mui .......................... | 375/265 |
| 6,834,035 B1 | * | 12/2004 | Marukawa et al. ...... | 369/59.22 |
| 2005/0075672 A1 | * | 4/2005 | Rottenberg .................... | 607/9 |

OTHER PUBLICATIONS

Cadzow "Discrete-Time Systems" Prentice-Hall 1973 pp. 291 and 292.*

* cited by examiner

*Primary Examiner*—Arnold Kinkead
(74) *Attorney, Agent, or Firm*—Duane Morris LLP

(57) ABSTRACT

An apparatus and method for transmitting and receiving a communication signal includes selecting a pulse shape for a continuous phase modulated waveform, encoding specific information into the waveform to form a communication signal and transmitting the communication signal. The system receives the transmitted communication signal and samples the received signal at a specified rate, the sample rate being less than the symbol rate, enabling reconstructing the waveform and extracting encoded information at sub sample per symbol rates, thereby reducing the reliance on high speed wideband analog to digital converters (ADC) for high speed applications.

6 Claims, 10 Drawing Sheets

METHOD AND APPARATUS FOR SUB SAMPLE-PER-SYMBOL DEMODULATOR FOR A SPECTRALLY EFFICIENT WAVEFORM WITH AN LPI FEATURE

BACKGROUND

Known digital demodulation approaches typically use a power-of-2 integer number of samples-per-symbol (i.e. 1, 2, 4, 8 or more) to aid timing recovery. Multiple samples-per-symbol are used since the timing recovery is thus simplified. However, this known technique places a high performance requirement on a receiver's Analog to Digital Converter (ADC) sample rate in order to capture the incoming signal. Further, in known systems the "information" embodied in the samples concerning the incoming waveform is not fully utilized as the samples generally are not used to reconstruct the incoming waveform. Rather, the samples in the known prior art systems are only used to determine the optimal decision time and the corresponding symbol value at the decision time.

These known prior art approaches cause two main issues to become relevant for high data rate links: the spectrum of high symbol rate signals can greatly exceed the analog input bandwidth of "available" ADCs; and the ADC sample rate of "available" ADCs is insufficient to capture the number of samples per symbol needed to support accurate timing recovery. Wherein the term "available" means meeting the system or symbol rate requirements.

ADC sample rates limit the number of symbols-per-second that may be transferred and the ADC input bandwidth requires a certain spectral containment of the incoming communication signal. Prior art ADCs are limited by sample rates that limit the number of channel symbols-per-second that can be converted from an analog signal to a digital signal, and input bandwidth which necessitates a small spectral containment or frequency band for the communication signal. These two limitations inherent in known prior art systems are fundamental limits not only for high data rate communication systems, but also for low data rate communication systems where power or cost drivers may limit the choice of "available" ADC candidates. The problems of the known art described above may be put in context with the following numerical example. A data link requiring 32 Gbits/sec using a prior art system applying 16-Quadrature Amplitude Modulation (QAM) yields a symbol rate of 8 Gsym/sec which implies the ADC must provide 16 Gsamples/sec (at 2 samples per symbol) or more for timing recovery. The ADC analog bandwidth (at 0.25 dB) required is 5.4 GHz for a modest roll-off factor of 0.35. This performance is clearly outside the boundary of known ADCs available today or in the near-future. A typical approach to reduce the required input bandwidth and sample rate for ADCs in current communication systems is to employ known higher-order linear modulations (i.e. M-ary QAM to which pulse shaping may be applied or shaped M-ary phase shift keying (PSK) with M>2). For a given data rate, higher-order modulations improve the spectral efficiency of an information bearing signal and lower the channel symbol rate. This reduces the requirements on a receiver's ADC input bandwidth and sample rate. However, high-order linear modulations typically they have non-constant envelopes either by constellation design (i.e. QAM) or intentional channel filtering (i.e. the Nyquist pulse shaping used to control intersymbol interference for linear modulations). Non-constant envelope signals have a peak-to-average signal power-ratio (PAR) greater than unity, which in turn negatively impacts receiver dynamic range requirements. But perhaps the more deleterious effect is the waveform distortion encountered when the communication channel is nonlinear. Nonlinear channels are typically encountered where high-efficiency transmit power amplifiers are employed (i.e. satellite downlinks, wireless handsets). In most cases typical linear equalization approaches cannot be used to correct the distortion, and system performance can become unacceptable. While nonlinear equalizers are possible, they typically are unattractive for many applications from cost, complexity, and throughput considerations.

Known prior art communication systems providing Low Probability of Intercept (LPI) on a data stream typically rely on spread spectrum modulation techniques such as direct sequence or frequency hopping. These known approaches introduce complicated circuitry and reduce spectral efficiency. Additionally, alternatives are desirable for providing LPI on a data stream without relying on prior art solutions of spread spectrum.

In embodiments of the present invention, digital data is encoded into a waveform of arbitrarily narrow bandwidth so that the waveform may be sampled at a relatively low rate (less than or equal to 1 sample per symbol), and then reconstructed to an arbitrary number of samples-per-symbol in the receiver. The symbol duration is greater than the duration between successive symbols, thus creating Intersymbol Interference (ISI). It is through the deconstruction of the ISI that the encoded information is obtained.

The disclosed embodiments of the present invention do not rely on higher-order modulation formats of the prior art. Hence, the embodiments avoid the pitfalls of the prior art schemes when used with non-linear and/or power-limited and/or spectrally-limited channels. The embodied processes exploit the limited spectral extent of low h (modulation index) and low BTP (bandwidth-time product) of known binary Gaussian Partial Response Continuous Phase Modulation (PRCPM) waveforms. As is known in the art, the PRCPM waveform is a constant envelope partial response signaling format. Embodiments of the waveform have the same analytic form as Gaussian Minimum Shift Keying (GMSK), but use an entirely different regime of operating conditions.

For example, using $h=\frac{1}{8}$ and $BTP=\frac{1}{32}$, a binary alphabet (M=2) and a "Gaussian" frequency pulse, embodiments of the present invention may attain 10 bps/Hz spectral efficiency (FIG. 1). This means that for a 32 Gbps link, the PRCPM waveform requires only 3.2 GHz of bandwidth, using the 95% spectral containment definition, and can be Nyquist sampled at rate of 6.4 Gsamples/second, which is well below the symbol rate (binary symbols) of 32 Gsymbo Vsec. The ADC sample rate performance and bandwidth is also less demanding than the 16-QAM approach described above. By using lower modulation indices and lower time-bandwidth products to increase the spectral efficiency, the advantage of the PRCPM scheme over known higher-order linear modulations may be further increased.

In principle, any ADC may be used as an acquisition device with an appropriate selection of PRCPM waveform parameters. However, a trade-off exists between the demodulator complexity and latency as the spectral efficiency of the PRCPM waveform is increased. Therefore, in practice, the spectral efficiency and ADC performance requirements (analog bandwidth and sample rate) must be optimized for a particular system.

The prior art higher-order linear modulation waveforms, such as M-ary QAM with M=64,128,256 or more, could be used to reduce the symbol rate and provide a more compact spectrum. However, this option requires more transmit power than lower-order versions of the same modulation type (i.e. 16-QAM) to achieve the same Bit Error Rate (BER) performance. A similar comment applies to other linear modulation classes such as PSK. In contrast, the binary Gaussian PRCPM waveforms, embodied in the present invention has a significant power advantage over known high-order linear modulation waveforms. Additionally, if the channel is nonlinear, the potentially high peak-to-average-ratio (PAR) of linear modulations requires special considerations in the link design to mitigate the effects of the PAR such as for shaped/unshaped QAM and shaped PSK, and the decreased spacing of constellation points such as for shaped/unshaped PSK, which are not required by the present invention. These prior art mitigation approaches lead to decreased system performance in certain aspects of the communication system (i.e. bandwidth, throughput, power). No such mitigation and associated deleterious effects are necessary with the waveforms used in embodiments of the present invention.

Embodiments of the invention are useful for nonlinear channels found in, for example mobile handsets, portable power-sensitive communication devices, SATCOM downlink channels and other links where power and spectrum may be at a premium, both with respect to availability and cost. It is to be understood that the invention is not limited to the above examples. With a binary non-linear modulation format used in embodiments of the present invention, data rates are enabled far beyond what binary linear modulation formats are capable of, thereby potentially greatly increasing revenue in spectrally limited applications. Also comparing the data rates of known prior art higher-order linear modulations to the present inventive embodiments introduced here it is noted, while the data rates can be made comparable, the present inventive embodiments do not introduce the design difficulties encountered with linear modulations. The overall process used with embodiments of the present invention is compatible with software-defined radio architectures. Additionally, the disclosed embodiments have an inherent LPI feature not found in known prior art linear modulation formats.

The benefits of the present invention are manifold. The invention allows use of ADCs with limited input bandwidth and sample rates. The invention makes possible the use of very low sample rate ADCs, relative to the communication signal symbol rate, in a communication receiver without resorting to high-order modulation. The invention lowers the required sample rate of the receiver ADC which enables ADCs with greater resolution and less power to be used than might otherwise be possible. This advantage is not limited to high data rate applications. Furthermore, the waveform used in embodiments of the invention are useful where LPI is desirable due to the inherent ISI present in the received waveform. As the peak-to-average (PAR) signal power ratio of waveforms generated by use of the invention approaches unity, use in non-linear channels is facilitated.

Therefore, it is an object of the present invention to obviate the problems of the prior art by presenting a novel system for processing a communication signal comprising a continuous phase modulated waveform containing information symbols of an M-ary alphabet, i.e., M=2, 4, 8, 16, etc., an analog-to-digital converter (ADC) operating at a sample rate at or less than the symbol rate of the communication signal, an interpolator for digitally reconstructing the waveform and a demodulator for extracting the information symbols from the reconstructed waveform.

It is another object of the present invention to provide a novel method for communicating information symbols with spectral efficiency. An embodiment of the method includes selecting a pulse shape for a partial response continuous phase modulated (PRCPM) waveform, encoding the information into the waveform to form a communication signal and, transmitting the communication signal. The embodiment also includes receiving the communication signal, sampling the communication signal at a sample rate less than the symbol rate to obtain signal samples, reconstructing the waveform from the signal samples and extracting the information encoded into the waveform.

It is still another object of the present invention to provide a novel improvement for a method of demodulating a PRCPM waveform containing information symbols at a symbol rate $R_s$, wherein the waveform is converted from analog to digital in an ADC by sampling the waveform at a rate less than or equal to the symbol rate $R_s$.

It is yet another object of the present invention to provide a novel improvement for a communication system for transmitting and receiving information symbols via a PRCPM waveform at a high symbol rate by using a PRCPM waveform described by the equation:

$$s(t) = \sqrt{\frac{2E_s}{T_s}} \cos(2\pi f_o t + \Phi(t, \alpha) + \phi_0)$$

where $\Phi(t,\alpha)$ is a continuous function, expressed as:

$$\Phi(t, \alpha) = 2\pi h \sum_{k=-\infty}^{\infty} \alpha_k q(t - kT_s)$$

where h is the modulation index, q(t) is the phase pulse shape, and $T_s$ is the symbol duration and $\alpha_k$ are information symbols. The phase pulse shape is related to the frequency pulse shape g(t) as:

$$q(t) = \int_{-\infty}^{t} g(\tau) d\tau$$

It is a further object of the present invention to provide a-novel method of secure communication between a transmitter and a target receiver in an environment of extraneous receivers. One embodiment of the method comprises encoding information symbols in a PRCPM waveform and transmitting from the transmitter the waveform at a symbol rate greater than the maximum sample rate of the extraneous receivers. Another embodiment uses the PRCPM approach which provides security by a unique low-probability of intercept (LPI) feature. This feature may be obtained by partial response signaling using low h and low BTP. The PRCPM approach to LPI does not require the bandwidth expansion of standard LPI techniques such as chip rate withering or fast frequency hopping. Another embodiment of the method comprises encoding information symbols in a PRCPM waveform and transmitting from the transmitter the waveform at a symbol rate greater than the maximum sample rate of the extraneous receivers. The method also includes receiving the waveform at the target receiver, sampling the waveform to obtain signal samples and reconstructing the waveform from the signal samples. The method may additionally include the step of demodulating the signal to yield the information bits of the transmitted message.

It is an additional object of the present invention to provide, in a communication system with a base station and at least one remote station, a novel method for transmitting a communication signal having a waveform with information symbols from the base station to the at least one remote station. An embodiment of the novel method comprises the steps of: providing to the base station the maximum conversion rate and spectrum limitation of one or more of the at least one remote stations and selecting, at the base station, phase pulse shape parameters (i.e. modulation index, phase pulse, BTP, duration) for the waveform based on the maximum conversion rate and spectrum limitations provided to the base station. The method also includes the step of transmitting from the base station the communication signal with the selected pulse shape parameters at a symbol rate greater than the maximum conversion rate of one or more of the at least one remote stations.

These and many other objects and advantages of the present invention will be readily apparent to one skilled in the art to which the invention pertains from a perusal or the claims, the appended drawings, and the following detailed description of the preferred embodiments

DETAILED DESCRIPTION

The spectrally compact nature of a Partial Response Continuous Phase Modulated (PRCPM) communication signal, particularly as used in embodiments of the invention in combination with a binary alphabet=2), a phase pulse derived from a Gaussian filter, extremely low modulation indices (i.e. "low-h"), and small bandwidth-time product (BTP) enables ADCs, even with modest analog bandwidths and sample rates, to provide the necessary data samples for proper demodulation of very high data rate signals. The achievable spectral efficiency of the communication signal is limited in practice only by the tolerable complexity in the demodulator.

Figure 1:
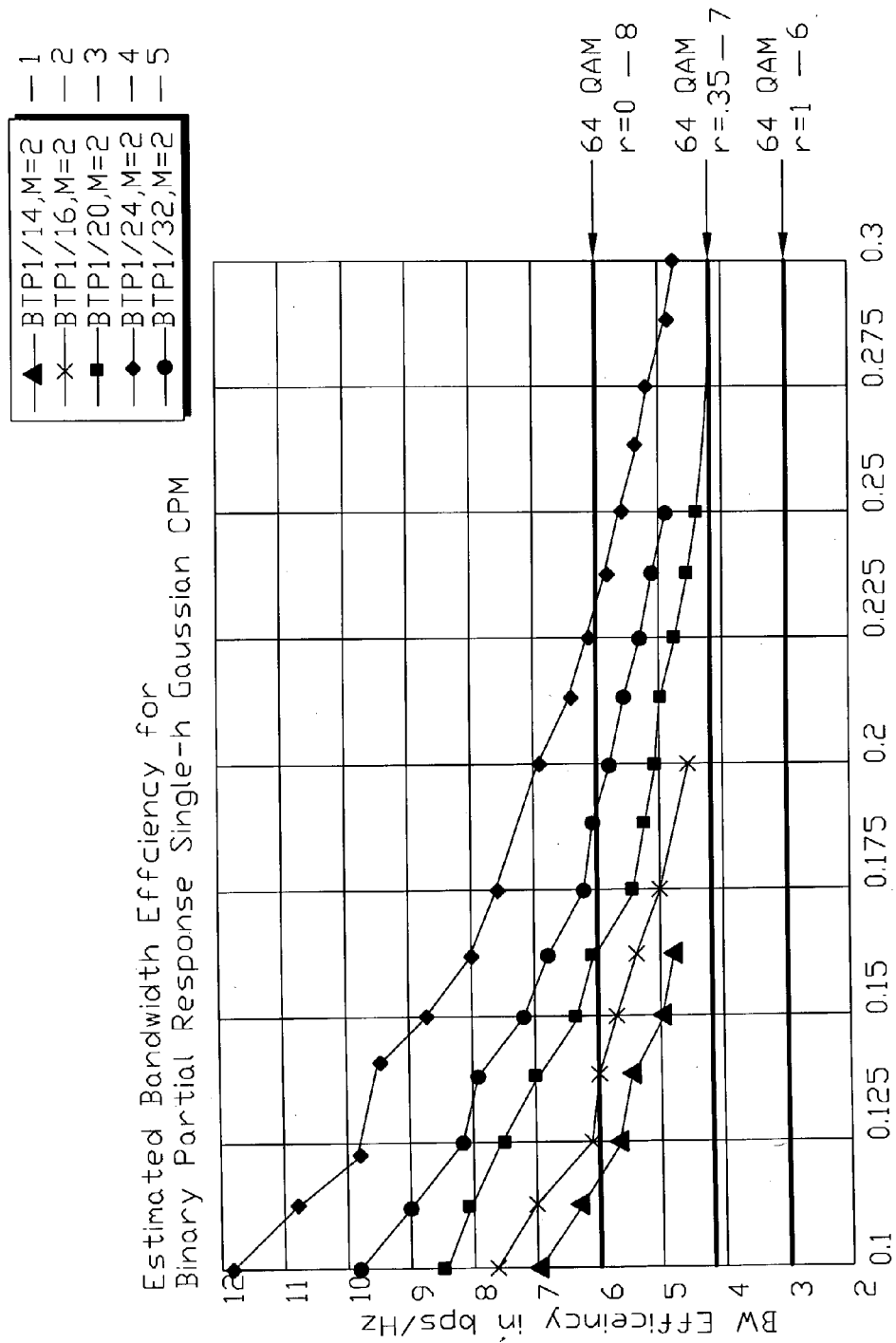
FIG. 1 is a graph comparing the spectral efficiency of binary Gaussian PRCPM with prior art QAM schemes.

An M-ary waveform of the present invention has a constant envelope modulation, and can be selected to attain arbitrarily high spectral efficiency without resorting to higher-order modulation formats of the known prior art as shown in FIG. 1. Our current embodiment discusses only the binary case (M=2), but higher-order formats are not precluded and would be obvious to those skilled in the art. FIG. 1 shows the bandwidth (BW) efficiency in bps/Hz (bits per second per hertz) for embodiments of the present invention and 64-QAM prior art formats. Embodiments of the present invention designated in FIG. 1, (1, 2, 3, 4 and 5) are binary with a BTP of 1/14, 1/16, 1/20, 1/24 and 1/32 respectively. The prior art formats 6, 7 and 8 include 64-QAM at r=1, 0.35, and 0 respectively, where r is the roll-off factor characterizing the steepness of the filter roll-off.

As is readily apparent in FIG. 1, the modulation index h has a direct relationship to the BW efficiency for embodiments of the invention, whereas the BW efficiency of the prior art QAM formats are independent of h as evident by the flat lines representing the prior art formats. Other linear modulations, such as PSK will show similar independence of the parameter h.

High data rate communications are thus possible without requiring increased ADC conversion speeds or higher-order modulation formats. Hence, disclosed embodiments may be used over band-limited channels with high data rates. The application of the present invention is limited only by decoder delay and complexity tolerable in a practical application. Specifically, when using a binary alphabet as in the embodiments shown in FIG. 1, the present invention may transmit information well beyond the theoretical limit of 2B symbols-per-second, where B is the channel bandwidth, for prior art linear spectrally efficient modulation formats.

A PRCPM waveform according to embodiments in the invention is described below. The PRCPM waveform is given by:

$$s(t) = \sqrt{\frac{2E_s}{T_s}} \cos(2\pi f_o t + \Phi(t, \alpha) + \phi_0)$$

Where $\Phi(t,\alpha)$ is a continuous function called the excess phase, and it is expressible as:

$$\Phi(t, \alpha) = 2\pi h \sum_{k=-\infty}^{\infty} \alpha_k q(t - kT_s)$$

where h is the modulation index and q(t) is the phase pulse shape. Both parameters are selected to control the expanse of the spectrum, while q(t) also controls the spectral shape of the communicating waveform. The $\alpha_k$ are the information symbols and are chosen from an M-ary alphabet, where usually M is a power of two. $T_s$ is the symbol rate. The excess phase is the information-bearing portion of the waveform.

Figure 2:
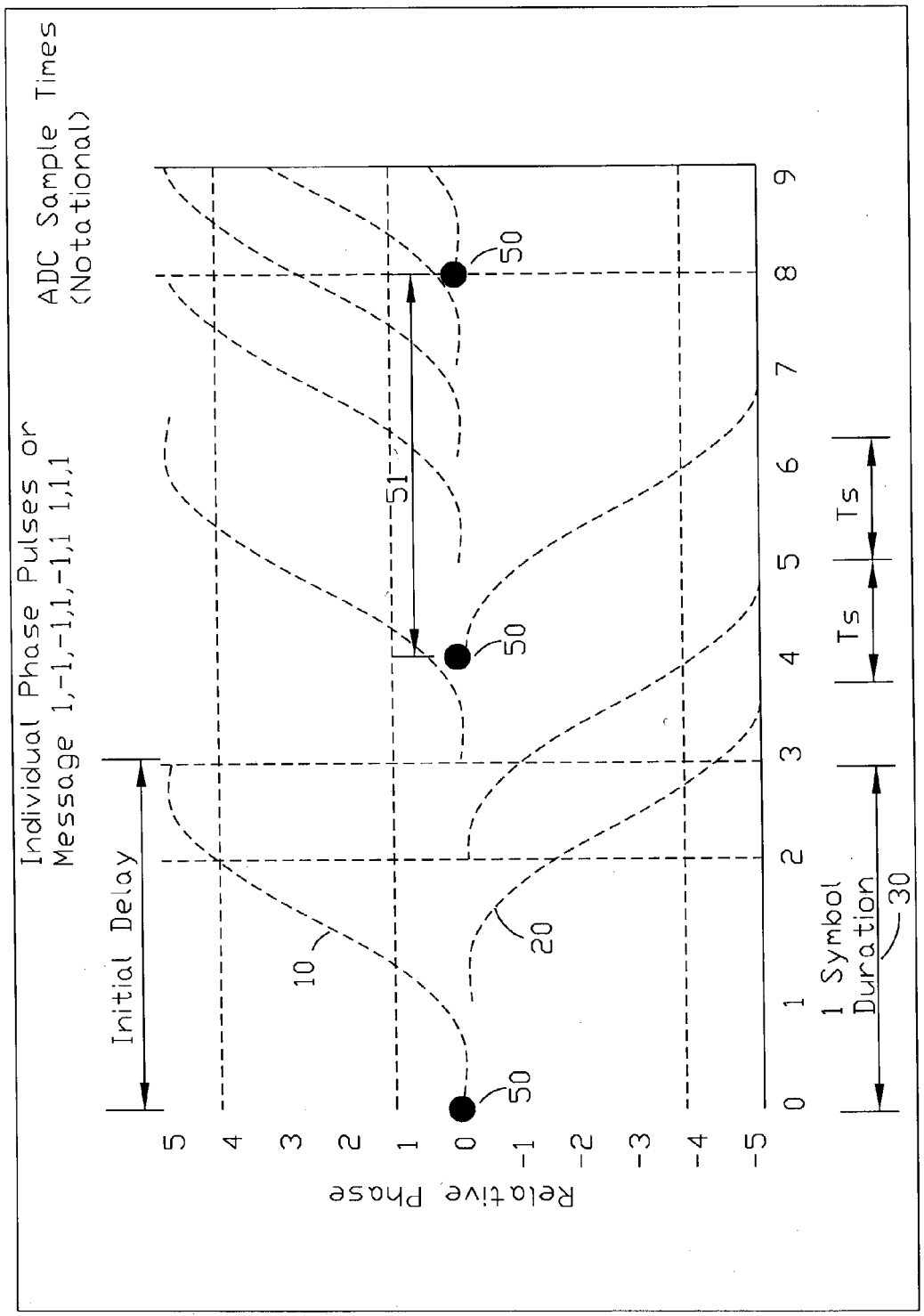
FIG. 2 is a representation of the individual phase pulses corresponding to different message bits for an embodiment of the present invention for the message 1,−1,−1,1,−1,1,1,1,1.

A sequence of phase pulses (normalized to 1 symbol per second) is shown in FIG. 2 for the information symbol sequence 1,−1,−1,1,−1,1,1,1,1. The positive phase pulses 10 represent the information symbol "1", whereas the negative phase pulses 20 represent the information symbol "−1". The ADC sample times 50 are locations along the time axis shown in the particular embodiment with a sample time period 51 greater than the symbol duration 30.

Figure 4:
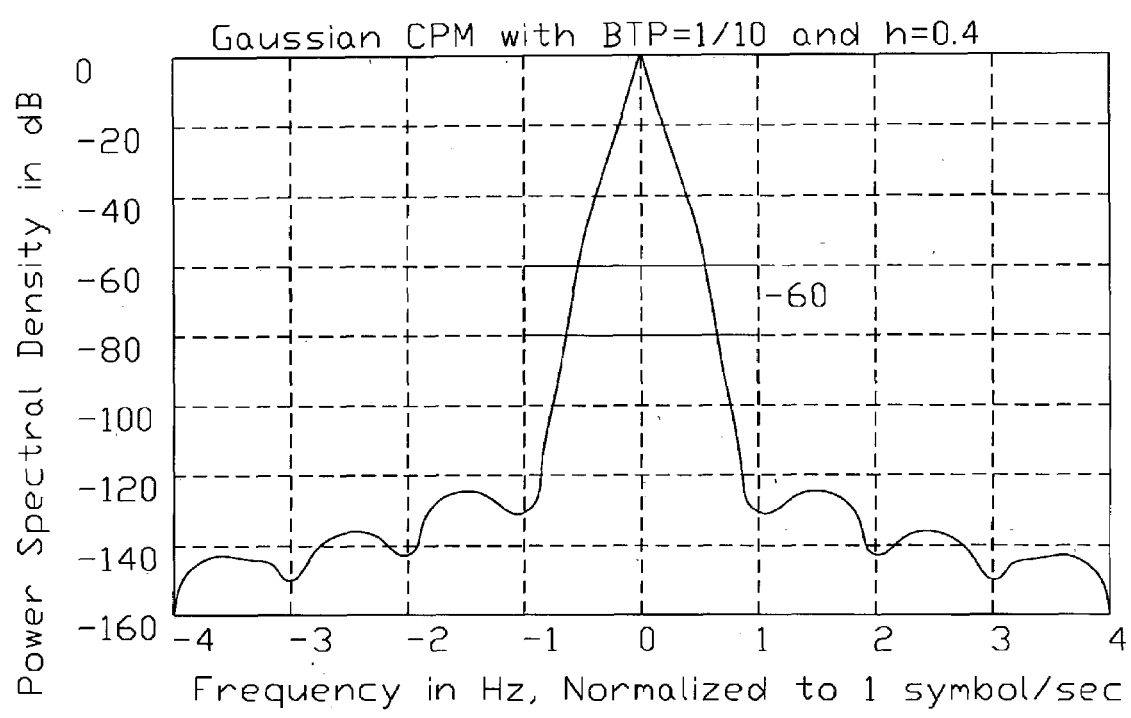
FIG. 4 is a graph of the power spectral density for a Gaussian CPM waveform with BTP=0.1, h=0.4.
Figure 5:
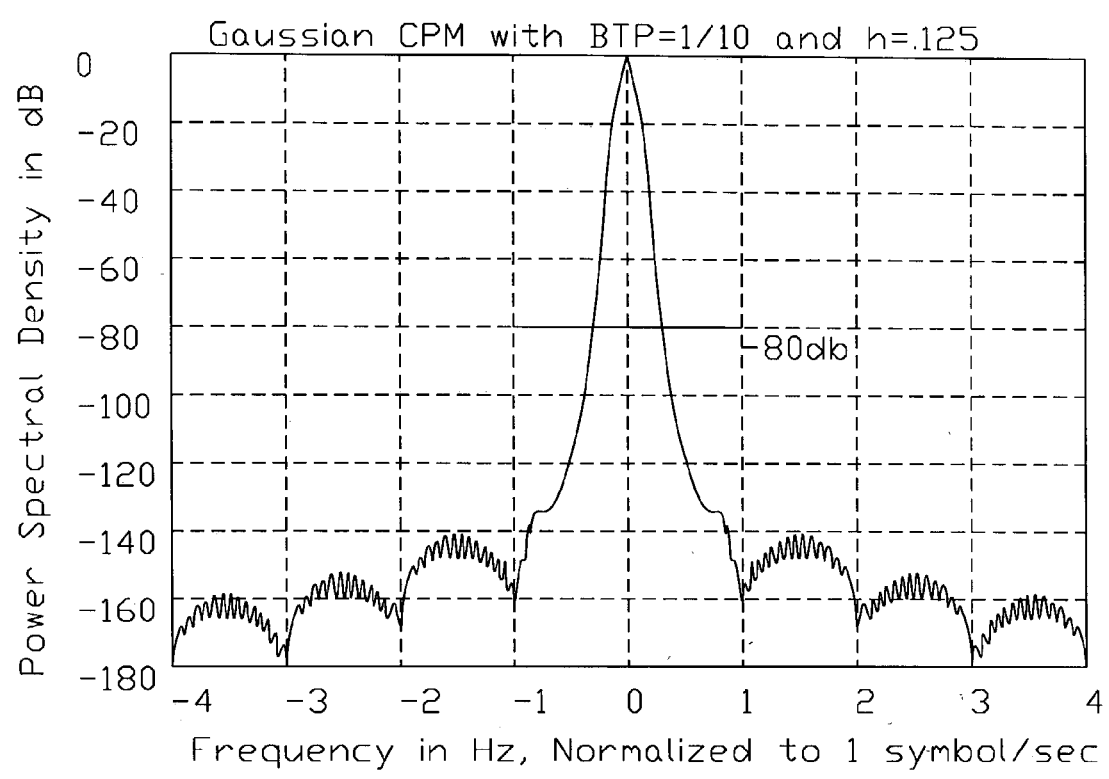
FIG. 5 is a graph of the power spectral density for a Gaussian CPM waveform with BTP=0.1, h=0.125.
Figure 6:
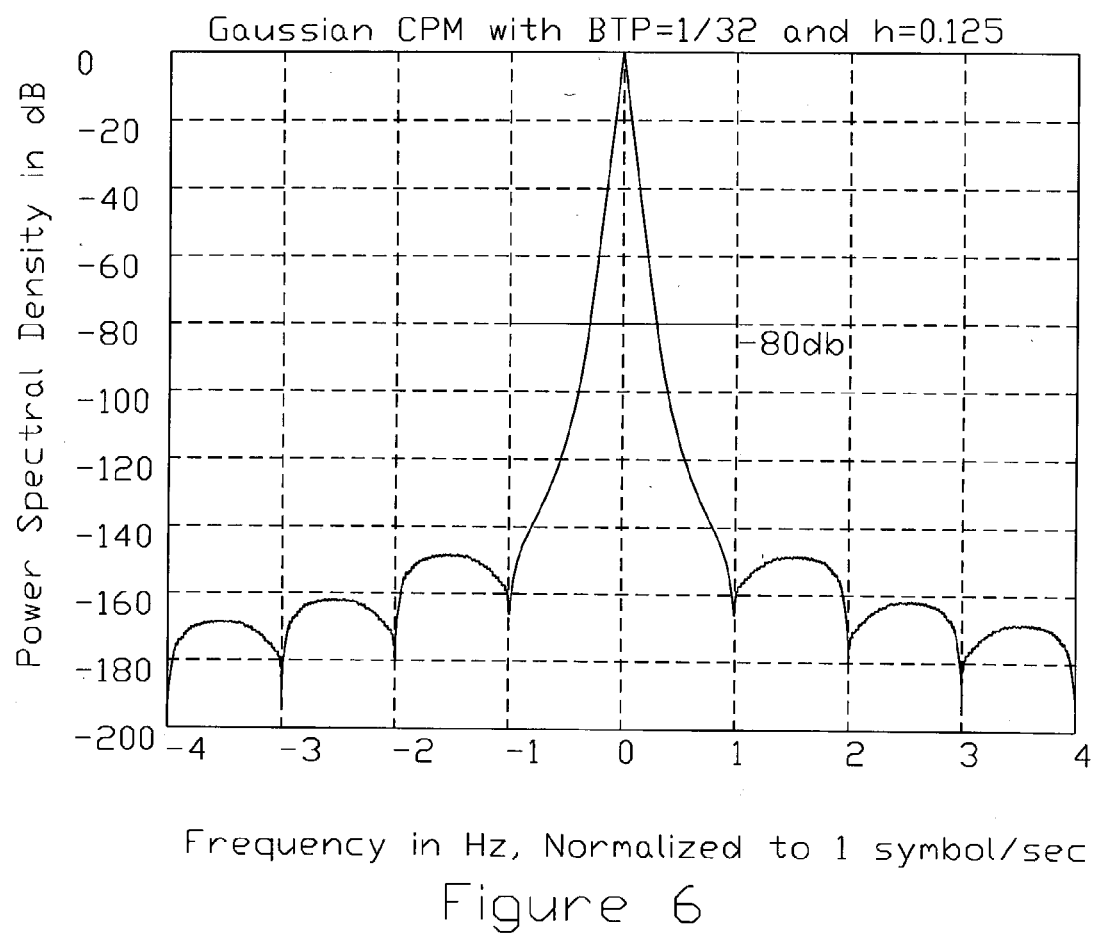
FIG. 6 is a graph of the power spectral density for a Gaussian CPM waveform with BTP=0.03125, h=0.125.

In FIG. 2, it is important to note the feature that each symbol has not traversed its full range or symbol duration 30 before the next symbol enters the channel. This corresponds to Intersymbol Interference (ISI), which is usually detrimental in communications. The ISI occurs because each symbol duration, at least in this example, is 3 times longer than the symbol period, defined as the inverse of symbol rate or symbol frequency. However, the illustrative example in FIG. 2 and elsewhere within the invention is not limited to this relationship and other relationships are equally foreseen and not excluded herein. The symbols are intentionally lengthened, by reducing h and BTP to produce a more compact spectrum as shown in FIGS. 4–6 which are discussed later in greater detail. The preferred embodiment uses symbol support of 1/BTP symbols, where BTP is typically 10 or more. The aggregate excess phase signal for the information sequence from FIG. 2 is shown in FIG. 3.

Figure 3:
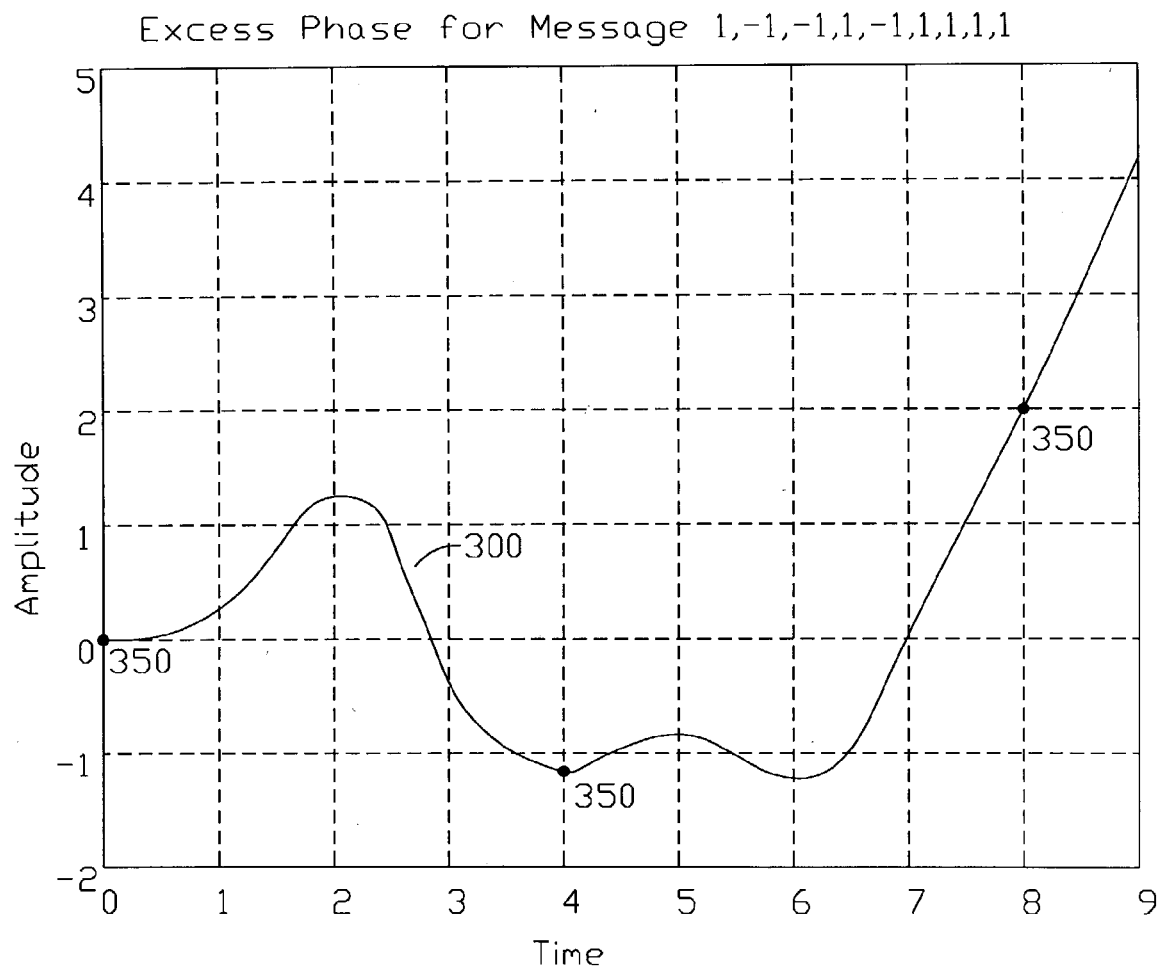
FIG. 3 is a representation of the excess phase for the message 1,−1,−1,1,−1,1,1,1,1 in an embodiment according to the present invention.

From FIG. 3, the ISI is visible relative to FIG. 2. The aggregate excess phase 300 is shown in the accumulation of the phase pulses in FIG. 2. The value of the excess phase at each ADC sample in FIG. 2 is shown at points 350. The sample points 350 form a sufficient basis for reconstructing the constituent phase pulses such as 10 and 20 in FIG. 2. An unintended receiver configured to receive waveforms other than a waveform generated according to an embodiment of the present invention cannot undo the ISI; however, the intended receiver will automatically undo the ISI given the "Trellis-coded" nature of the PRCPM modulation. The Trellis-coding is not explicit in CPM, but is a useful artifact of the waveform design. The "level" of ISI may be further complicated for low-probability of intercept (LPI) by the values selected for h and BTP.

Thus the embodiment of the invention using PRCPM waveforms offer a unique LPI feature. This feature is obtained by partial response signaling using low h and BTP. This approach to LPI does not require the bandwidth expansion of standard LPI techniques such as chip rate dithering or fast frequency hopping which are widely known in the prior art.

The spectrum of the Gaussian PRCPM for selected h and BTP combinations is shown below in FIGS. 4–6. For FIG. 4 BTP=1/10 and h=0.04, in FIG. 5, BTP=1/10 and h=0.125 and for FIG. 6, BTP=1/32 and h=0.125. The feature to note is that as h and BTP are reduced, the spectral support of the PRCPM waveform is greatly reduced. Even for the conditions in FIG. 4, the signal could be Nyquist sampled with small Mean-Square Error (MSE) at a rate of about 0.5 samples/symbol (−60 db aliasing products). For the conditions in FIG. 5, the sample rate could be reduced to about 0.4 samples/symbol and the aliasing (−80 db level) further reduced. A final example is shown in FIG. 6, where the sample rate may be about 0.2 samples/symbol for −80 db aliasing. The main lobe spectral support may be further limited, as desired, by further reducing the h and BTP as is clearly evident from FIGS. 4–6.

Figure 7:
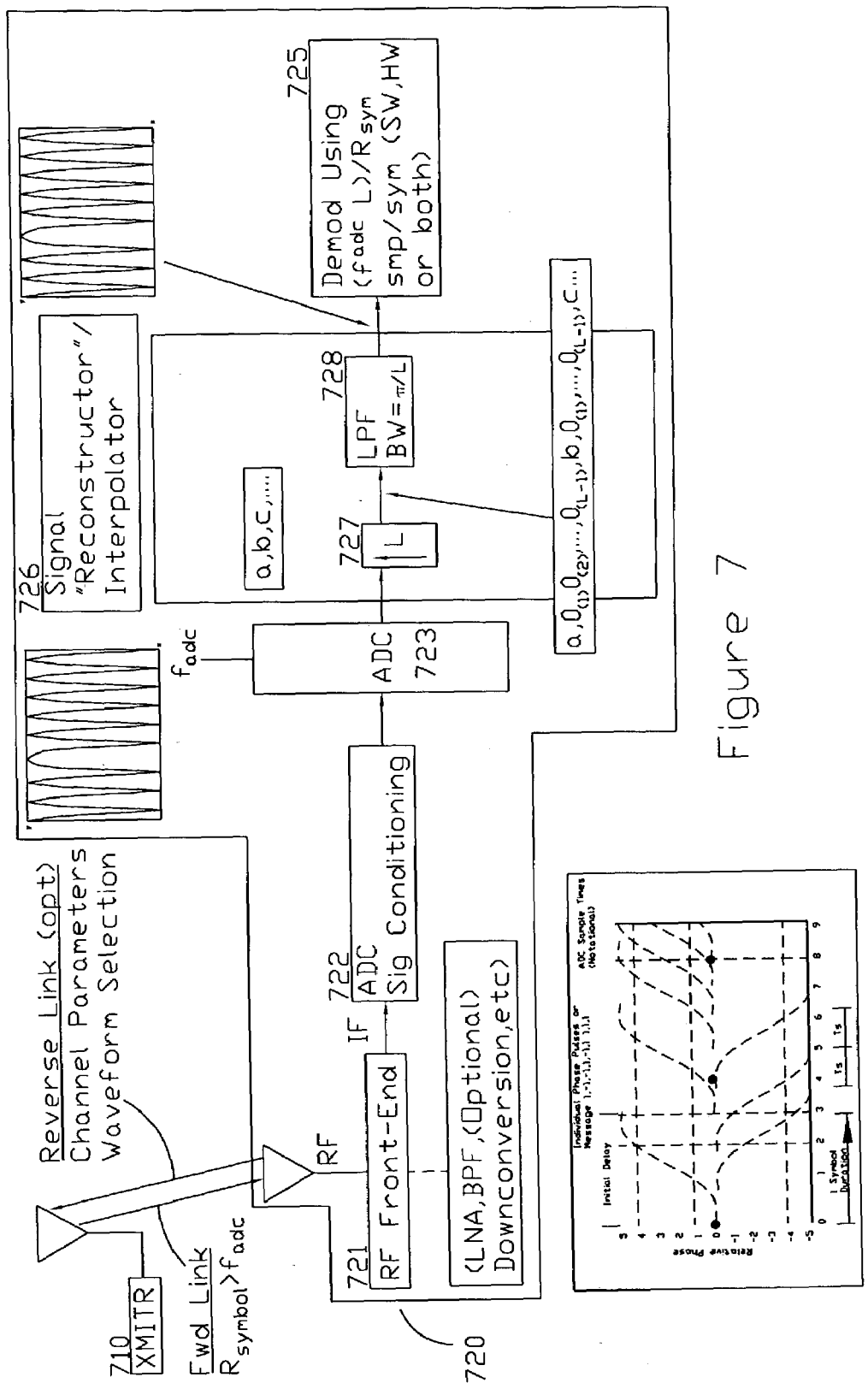
FIG. 7 is a high-level system diagram according to an embodiment of the present invention.

The system-level implementation is shown in FIG. 7. In this figure, the waveform is sent from a remote transmitting terminal 710 to an intended receiver 720. The receiver accepts the incoming signal and processes it using a suitable RF front-end 721 and ADC conditioning circuitry 722. These components are well known in the art and may include a variety of signal processing techniques. The ADC 723 operates at a sample frequency $f_{adc}$ less than the incoming symbol rate as discussed earlier. Such an approach offers the potential to make the ADC sample frequency much less than the symbol rate without resorting to higher-order modulation by appropriately choosing the phase pulse shape, h and BTP. As illustrated in FIG. 7, the constant envelope waveform is captured at the output of the ADC and the Nyquist sampling theorem is, to a good approximation, satisfied. Satisfying the Nyquist theorem is key to uniquely recovering the individual phase pulses such as 10 and 20 of FIG. 2 so the underlying symbol data stream can be recovered. Then, in order to achieve the desired number of samples-per-symbol for a particular demodulator 725, the information content in the acquired samples is upsampled by an interpolator 726. The interpolation process is the standard digital scheme of inserting L-1 zeros into the data stream between data samples at block 727, and low pass filtering the result at filter 728. The exact choice of L and low pass filter characteristic depends upon the application. The result using a known "brick-wall" filter is shown for a particular embodiment; however, other filter types are not precluded and are readily foreseen as being compatible for the use with the present invention. Due to the compact spectrum of the transmitted wave, the reconstruction error is made negligible. The output of the "reconstructor"/interpolator 726 is the same as if the demodulator 725 has been supplied data samples from a higher rate converter compatible with the demodulator sample rate requirement.

If, as shown in FIG. 7, a reverse link is available, any receiver can request that the transmitter select a particular PRCPM waveform (i.e. the h and BTP) so that any receiver's ADC is sufficient to capture the information. This feature may be exploited in a point-to-multipoint system, where the transmitter selects the waveform that satisfies each receiver's limitations.

Figure 8A:
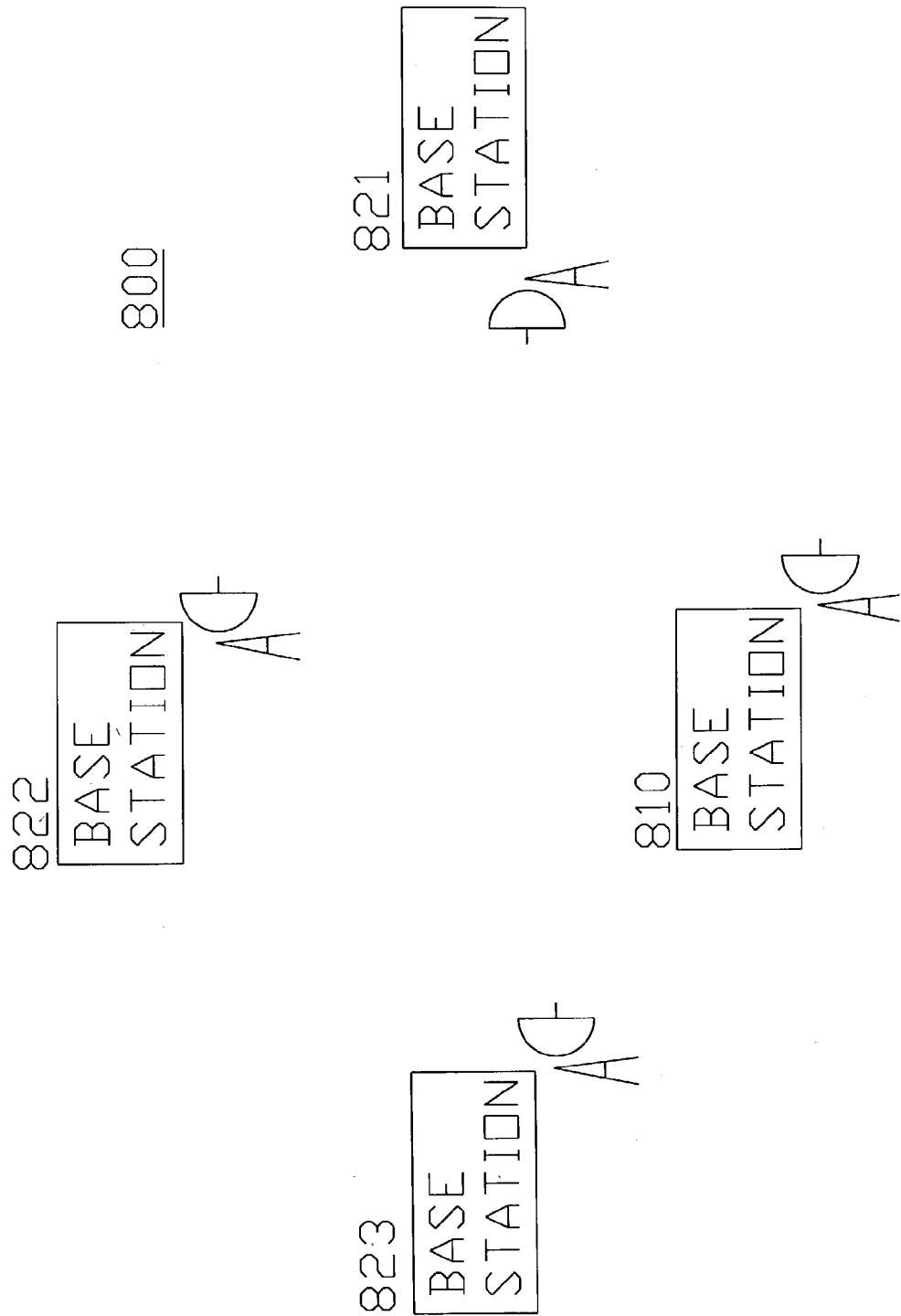
FIG. 8*a* is a representation of a point to multipoint system according to an embodiment of the present invention.
Figure 8B:
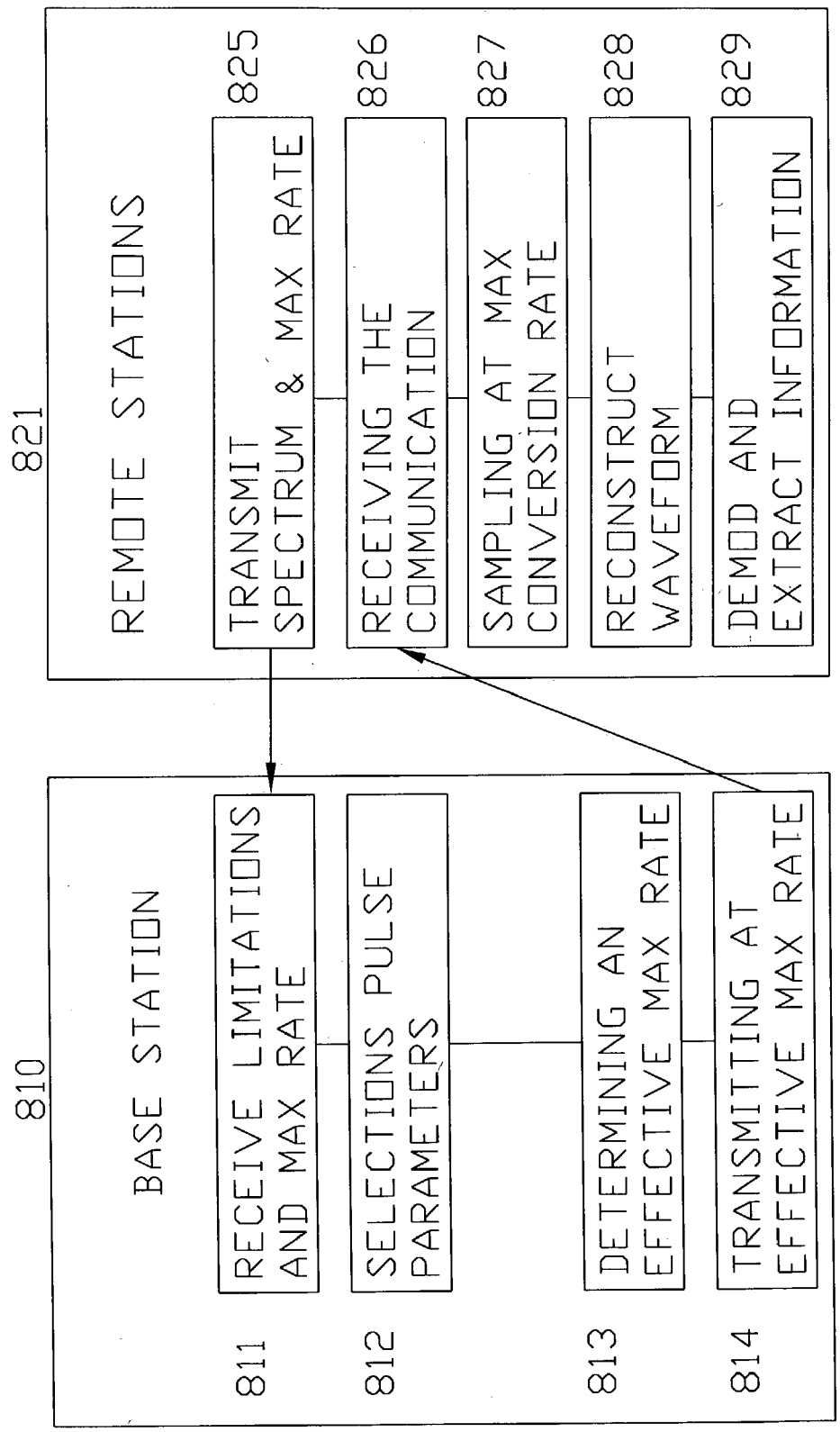
FIG. 8*b* is a flowchart of operation in a point to multipoint system according to an embodiment of the present invention.

FIGS. 8a and 8b show the implementation of the invention in a point-to-multipoint system. FIG. 8a is a representation of a point to multipoint system 800 including a base station 810 and a plurality of remote stations 821–823. These remote stations may be mobile or fixed stations and the number of remote stations is not limited to the embodiment shown, more or less remote stations are readily foreseen.

FIG. 8b is a flowchart of an embodiment of the present invention in a point to multipoint system of FIG. 8a. The remote station 821, exemplary of a plurality of remote stations, communicating with the base station 810, informs the base station of its respective conversion rate and spectral limitations in block 825. The base station 810 receives the transmitter information in block 811 and compiles the information with the information received from the other remote stations. The base station 810 in block 812 then selects pulse shape parameters associated with the spectral support of the most limited one of the remote stations. The selection ensures that all of the intended remote stations are capable of receiving the communication at the transmitter conversion rate and within the spectral and conversion rate limitations of each of the remote stations. The base station 810 determines the effective maximum symbol rate for each of the maximum conversion rates supplied by the remote station in block 813. In addition to selecting the pulse parameters, the base station also selects the lowest effective maximum symbol rate at which to transmit the communication. The base station or transmitter may then select the pulse shape parameters (i.e. spectral support) that enable all the remote receivers to receive the waveform with an arbitrary number of samples-per-symbol for each receiver's demodulator. The communication is transmitted 814 to the remote station at a symbol rate that may be higher than the sample rate for the remote stations. The communication signal is received by the remote station at block 826. The remote station proceeds in block 827 to sample the signal at the maximum conversion rate, in block 828 reconstruct the waveform and in block 829 demodulate and extract the information from the communication signal as described in an embodiment of the present invention. Thus given any ADC (which in large part restrains the maximum conversation rate of the remote stations), the base station 810 can alter the pulse shape to communicate at any spectral efficiency desired, subject to overhead (delay) in the remote station receiver for decoding. The data rate is not sacrificed, but there is an initial delay to receive the first symbol. The data then is received at a desired symbol rate independent of channel bandwidth constraints and ADC conversion rates.

Figure 9:
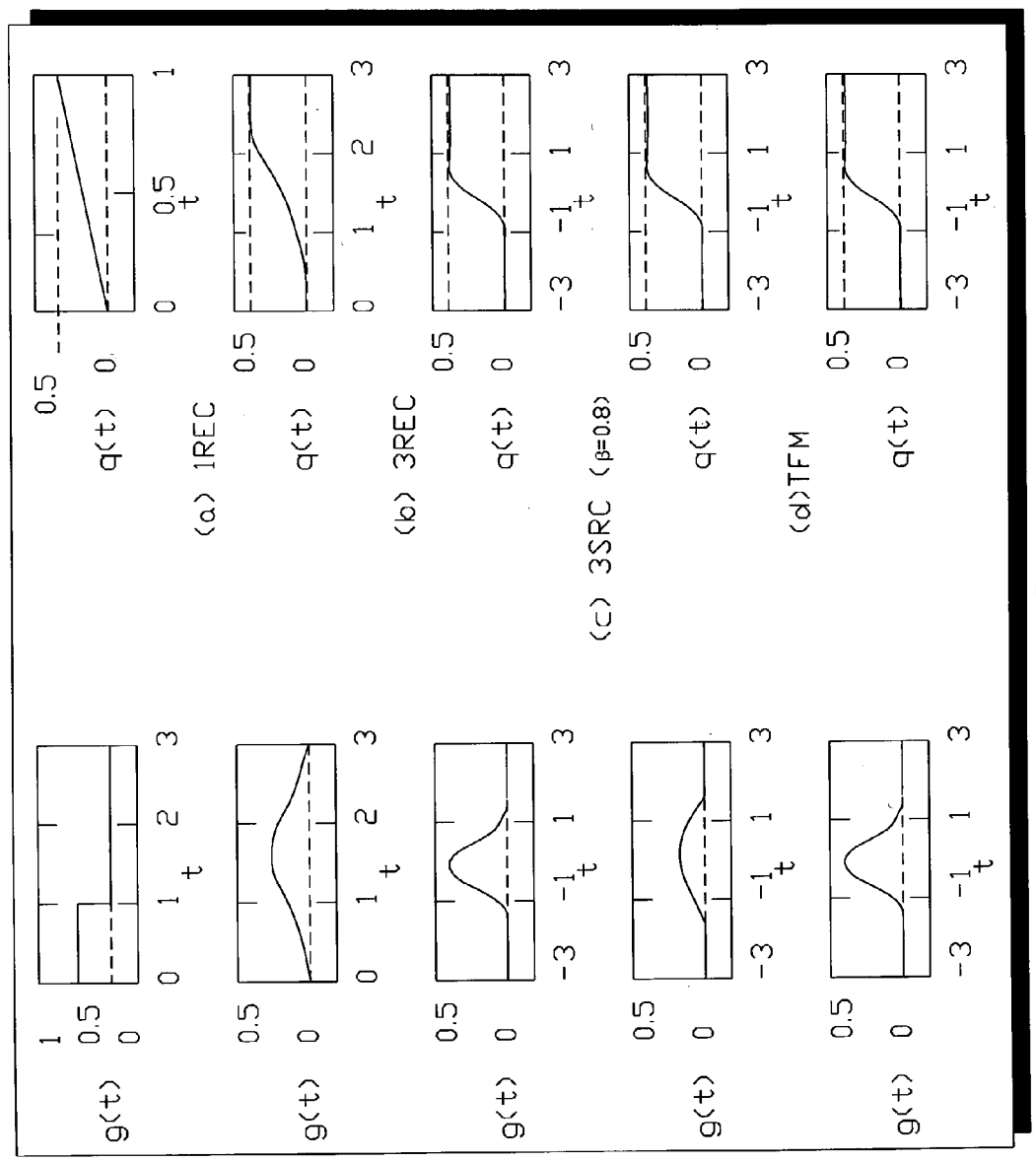
FIG. 9 is pictorial representation of possible pulse shapes for embodiments of the present invention.

The disclosed technique may be expanded to use any pulse shape desired by the system designer, including numerically derived expressions that may be derived to optimize spectral efficiency for a given available power level. An embodiment of an implementation of the invention has used a Gaussian pulse shape primarily for its smoothness in the time domain relative to other standard pulse shapes available analytically. However, we have not precluded the use of other pulse shapes, and any other suitable pulse shape could be selected as applications warrant. Examples of other possible partial response pulse shapes are presented in FIG. 9. It is to be understood that the pulse shapes shown in FIG. 9 are exemplary only and in no way limit the invention to those particular pulse shapes. The governing equations for L-symbol duration Raised Cosine (LRC), Tamed Frequency Modulation (TFM), L-symbol duration Spectral Raised Cosine (LSRC), Gaussian Minimum Shift Keying (GMSK) and L-symbol duration Rectangular Encoded (LREC) pulse shapes are shown below.

$$g(t) = \begin{cases} \frac{1}{2LT}\left[1 - \cos\left(\frac{2\pi t}{LT}\right)\right], & 0 \le t \le LT \\ 0 & \text{otherwise} \end{cases} \quad \text{LRC}$$

$$g(t) = \frac{1}{2}[g_o(t-T) + 2g_o(t) + g_o(t+T)] \quad \text{TFM}$$

$$g_o(t) = \frac{1}{T}\left[\frac{\sin\left(\frac{\pi t}{T}\right)}{\frac{\pi t}{T}} - \frac{\pi^2}{24}\frac{2\sin\left(\frac{\pi t}{T}\right) - \frac{2\pi t}{T}\cos\left(\frac{\pi t}{T}\right) - \left(\frac{\pi t}{T}\right)^2 \sin\left(\frac{\pi t}{T}\right)}{\left(\frac{\pi t}{T}\right)^3}\right]$$

$$g(t) = \frac{1}{LT}\frac{\sin\left(\frac{2\pi t}{LT}\right)}{\frac{2\pi t}{LT}}\frac{\cos\left(\beta\frac{2\pi t}{LT}\right)}{1 - \left(\frac{4\beta}{LT}t\right)^2}, \quad 0 \le \beta \le 1 \quad \text{LSRC}$$

$$g(t) = \frac{1}{2T}\left\{Q\left[2\pi B_b \frac{t - \frac{T}{2}}{(\ln 2)^{1/2}}\right] - Q\left[2\pi B_b \frac{t + \frac{T}{2}}{(\ln 2)^{1/2}}\right]\right\} \quad \text{GMSK}$$

$$Q(t) = \int_t^\infty \frac{1}{(2\pi)^{1/2}} e^{-\tau^2/2} d\tau$$

$$g(t) = \begin{cases} \frac{1}{2LT}, & 0 \le t \le LT \\ 0 & \text{otherwise} \end{cases} \quad \text{LREC}$$

Also numerically derived pulse shapes are possible candidates for particular applications.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. An apparatus for processing a communication signal comprising a continuous phase modulated waveform containing information symbols of an M-ary alphabet comprising:
   an analog to digital converter;
   an interpolator for reconstructing the waveform; and,
   a demodulator for extracting the information symbols from the reconstructed waveform;
   wherein the ADC operates at a sample frequency at or less than the symbol rate of the communication signal, wherein the waveform is:
   where $\Phi(t,\alpha)$ is a continuous function, expressed as:

$$s(t) = \sqrt{\frac{2E_s}{T_s}} \cos(2\pi f_o t + \Phi(t, \alpha) + \phi_0)$$

$$\Phi(t, \alpha) = 2\pi h \sum_{k=-\infty}^{\infty} \alpha_k q(t - kT_s)$$

where h is the modulation index, q(t) is the phase pulse shape and $\alpha_k$ are the information symbols. $T_s$ is the symbol rate.

2. The apparatus according to claim 1, where the phase pulse shape is $$q(t) = \int_{-\infty}^{t} g(\tau) d\tau$$

and g(r) is selected from the group of: LRC, TRM, LSRC, GMSK, LREC, and Gaussian pulse shapes.

3. In a method for demodulating a PRCPM waveform, containing information symbols, at a symbol rate n, wherein the waveform is converted from analog to digital in an ADC, the improvement comprising the step of sampling the waveform at a rate less than or equal to the symbol rate n, wherein the waveform is described by:

$$s(t) = \sqrt{\frac{2E_s}{T_s}} \cos(2\pi f_o t + \Phi(t, \alpha) + \phi_0)$$

$\Phi(t,\alpha)$ is a continuous function, expressed as:

$$\Phi(t, \alpha) = 2\pi h \sum_{k=-\infty}^{\infty} \alpha_k q(t - kT_s)$$

where h is the modulation index, q(t) is the phase pulse shape and $\alpha_k$ are the information symbols. $T_s$ is the symbol rate.

4. In a method for demodulating a PRCPM waveform, containing information symbols, at a symbol rate n, wherein the waveform is converted from analog to digital in an ADC, the improvement comprising the step of sampling the waveform at a rate less than or equal to the symbol rate n, wherein the symbol rate is greater than 2*B symbols/sec, where B is bandwidth.

5. In a method for demodulating a PRCPM waveform, containing information symbols, at a symbol rate n, wherein the waveform is converted from analog to digital in an ADC, the improvement comprising the step of sampling the waveform at a rate less than or equal to the symbol rate n, wherein the symbol rate is less than or equal to 2*B symbols/sec, where B is bandwidth.

6. The method according to claim 3, where the phase pulse shape is $$q(t) = \int_{-\infty}^{t} g(\tau)d\tau$$

and g(T) is selected from the group of: LRC, TRM, LSRC, GMSK, LREC, and Gaussian pulse shapes.

* * * * *